UNITED STATES PATENT OFFICE.

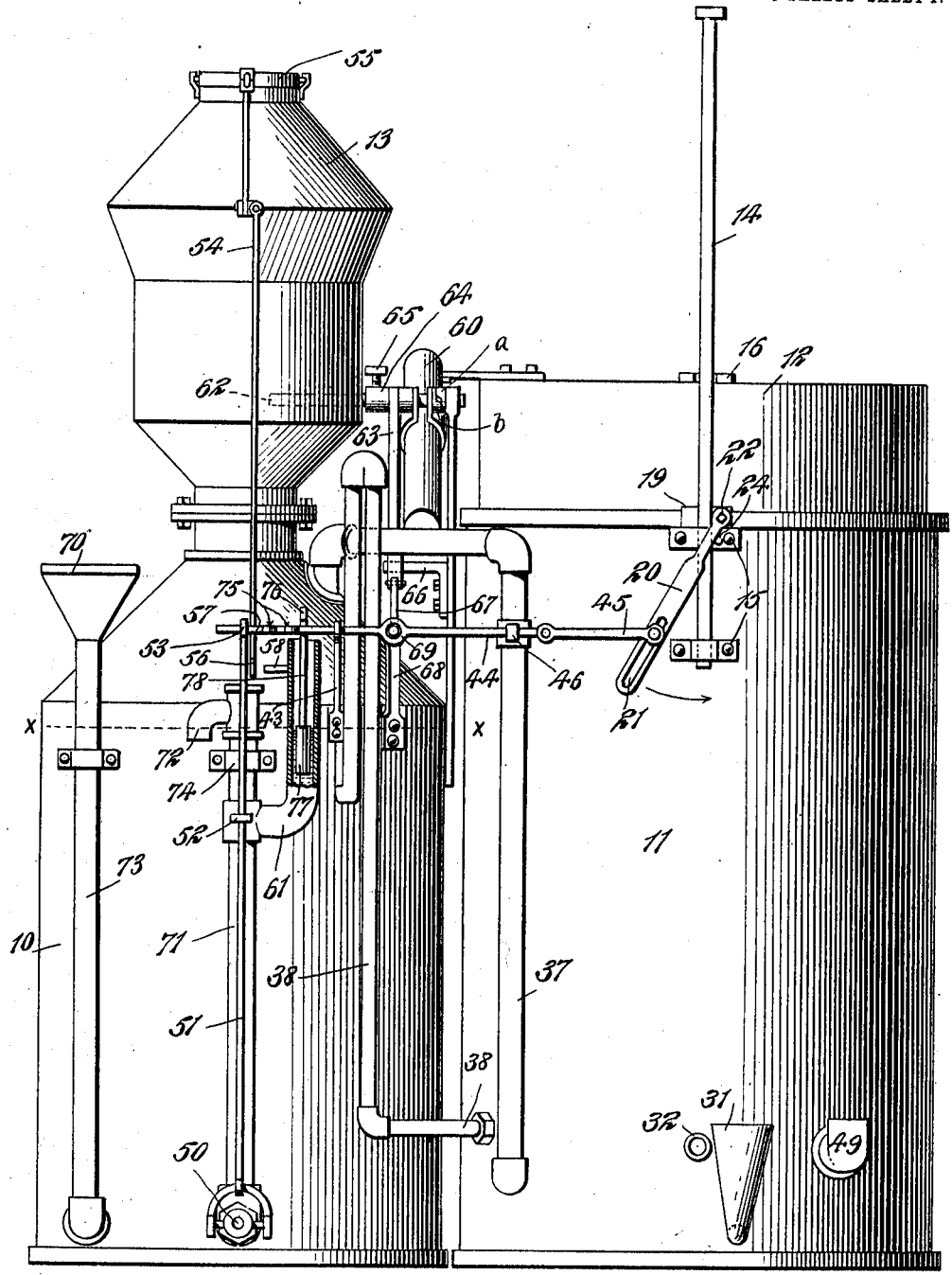

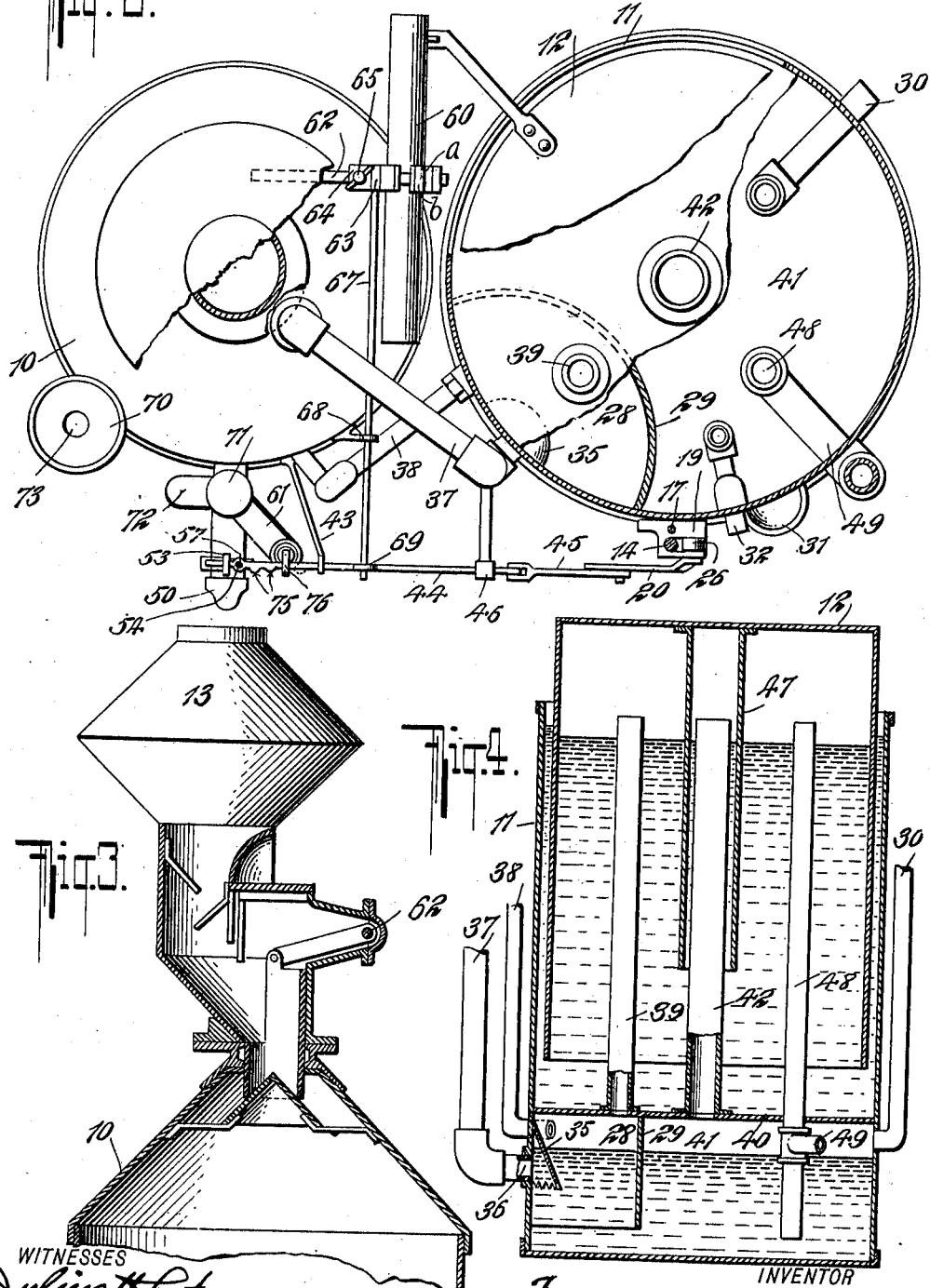

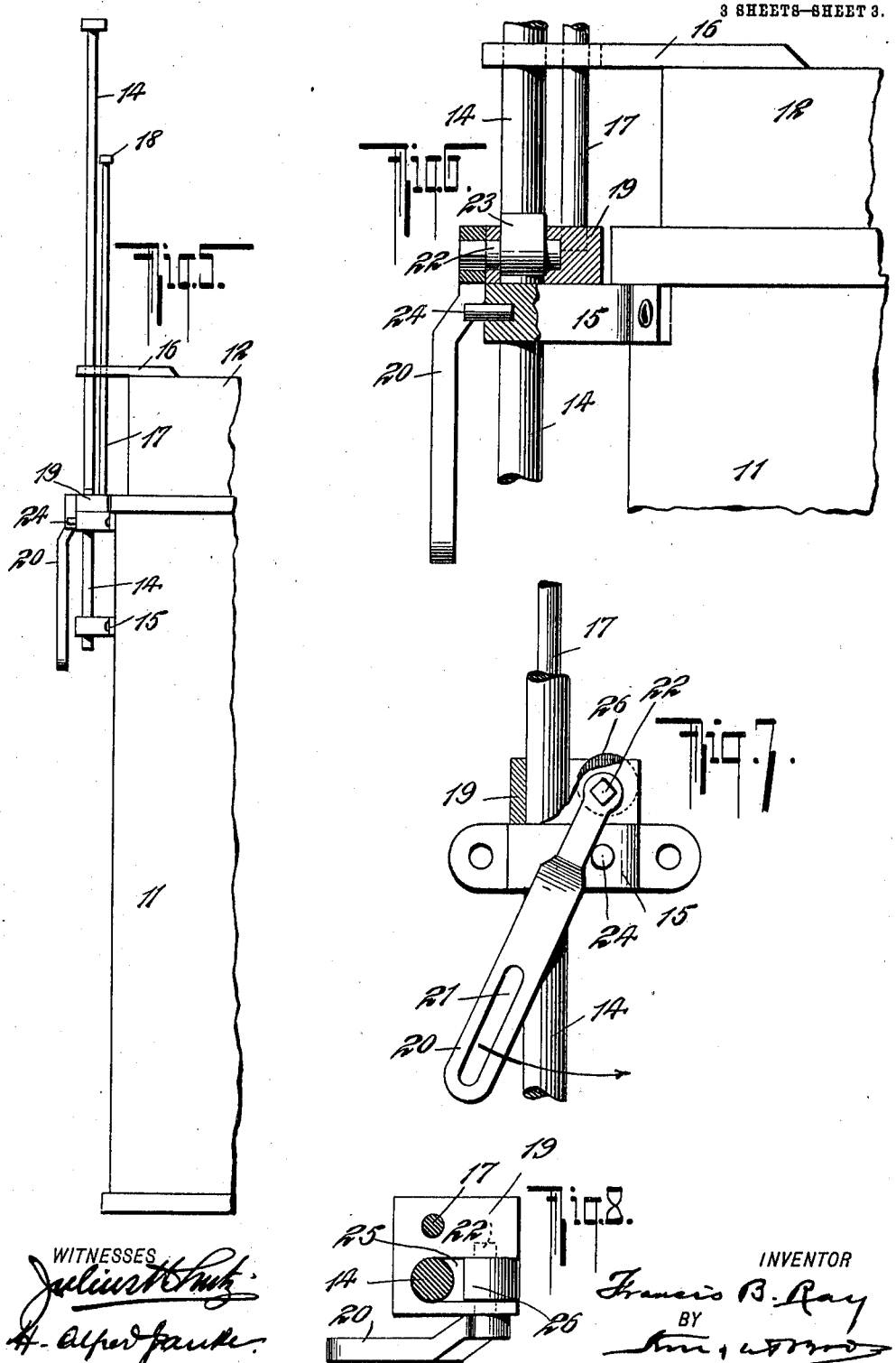

FRANCIS B. RAY, OF NEW YORK, N. Y., ASSIGNOR TO RAY ACETYLENE COMPANY, OF ELKHART, INDIANA, A CORPORATION OF SOUTH DAKOTA.

ACETYLENE-GENERATOR.

982,690.          Specification of Letters Patent.      Patented Jan. 24, 1911.

Application filed October 17, 1907. Serial No. 397,787.

*To all whom it may concern:*

Be it known that I, FRANCIS B. RAY, a citizen of the United States, residing in the city, county, and State of New York, have invented certain new and useful Improvements in Acetylene-Generators, of which the following is a specification.

It is well known that in the construction of acetylene generators, which do not require ventilating to the outside atmosphere during flushing the residuum out of the generator and which do not admit air at any time to the generator, various problems have to be solved.

First: A properly measured amount of gas must be provided to replace the water withdrawn from the generator in recharging the machine, since an excess of gas being allowed to enter the generator will escape through the open flush-gate and be lost, while an insufficient amount of gas supplied to the generator during the flushing will produce a vacuum and cause air to be sucked through the flush-gate.

Second: Most generators at present in use are provided with a trap or water-seal between the generator and the gas-bell in order to prevent the return of the gas from the bell to the generator and to secure an even pressure of gas at the burners, which would not exist if the passageway between the generator and the gas-bell were unobstructed. In this latter case the varying pressure of the generator caused by the more or less rapid decomposition of the carbid would cause in turn a corresponding fluctuation of the flames. Therefore, a water-seal of the kind above mentioned being necessary, provisions must be made whereby the gas is allowed to pass freely from the gas-bell back to the generator only during the flushing operation.

Third: Provisions must be made whereby the gas held in the gas-bell is prevented from being discharged from the carbid-holder whenever the cap or cover may be removed from any cause, since otherwise the whole amount of gas contained in the bell might almost instantly be discharged.

By the structure described in the following, these problems are solved in a manner which compels the operator to perform the necessary functions for flushing the generator in the sequence required.

A gas generator of this kind is illustrated in the accompanying drawings, in which—

Figure 1 is a front elevation of the generator and the gas-tank. Fig. 2 is a plan view thereof partly shown in section. Fig. 3 is a front view of the upper part of the gas generator showing the carbid-feed mechanism in section. Fig. 4 is a front elevation of the gas-tank and bell shown in section. Fig. 5 is a part of a side elevation of the gas-tank and gas-bell showing the measuring device for the gas-bell. Fig. 6 is a detail side view of the lower part of this measuring device in larger scale. Fig. 7 is a front view, and Fig. 8 a plan view thereof.

The means for providing a properly measured amount of gas for replacing the water in the generator chamber are as follows: In Fig. 1, 10 is a gas generator chamber of any suitable kind and 11 is the gas-tank in which gas-bell 12 is disposed. The gas-bell used in my apparatus is dimensioned to hold an amount of gas somewhat in excess of the amount required to properly fill the generator. The guide-rod 14, guiding the gas-bell by means of lug 16 fastened thereon and provided with a slot through which guide-rod 14 passes, is fastened at its lower end to gas-tank 11 by means of the two sockets 15. On guide-rod 14 is disposed between lug 16 and upper socket 15, sliding block 19 so that it has free movement up and down this rod (Fig. 5). On one side of block 19 (Fig. 8) is disposed in slot 25, through which rod 14 passes, an eccentric 26 mounted on shaft 22, to the square head of which is attached the handle 20, which is offset in the manner shown in Fig. 6 so that its upward pointing end will be at suitable distance from rod 14. It will be seen that if handle 20 is in the position shown in Figs. 7 and 8, block 19 will be free to move up and down on rod 14, and that if handle 20 is thrown in the direction indicated by the arrow in Fig. 7, the eccentric 26 operated by this movement will lock block 19 to rod 14. Between rod 14 and gas-bell 12 is disposed rod 17 passing with its upper end loosely through lug 16 and fastened at its lower end in block 19 (Figs. 5 and 6). A head 18 provided on rod 17 will prevent it from slipping out of lug 16. The length of rod 17 is dimensioned so that when the gas-bell 12 descends the distance between the head 18 of this rod and block 19, the bell has discharged an amount of gas equal to the amount of water discharged from the generator to properly flush the latter in the manner to be described later on.

In order to previously charge the bell with this proper amount of gas, in case it should not be already contained therein, the carbid-feed mechanism must be operated by hand until the gas-bell rises sufficiently to cause lug 16 to abut against head 18 of rod 17, thus tending to carry block 19 with rod 17 up on rod 14. At this instant the carbid-feed may be stopped. While block 19 rests on socket 15, handle 20 is held in the position shown in Fig. 7 by means of pin 24 fastened in the upper socket 15. It will be seen from Figs. 6 and 7 that in this position of block 19 the part of handle 20 near its pivot 22 is abutting against pin 24 and handle 20 is thus prevented from being thrown in the direction indicated by the arrow in Fig. 7. If now, owing to the operation of the carbid-feed mentioned above, gas-bell 12 has been caused to rise to the height above mentioned and to abut with lug 16 against head 18 of rod 17, it will, on slightly rising further, take along rod 17 and thus lift block 19 from socket 15. Pin 24 will thus come in line with the off-set portion of handle 20 so that the latter will be free to be moved in the direction indicated by the arrow in Fig. 7. Block 19 can now be locked to rod 14 by means of eccentric 26 as described above. This device for freeing the handle 20 only after the gas-bell has risen to abut with its lug 16 against head 18 and slightly lifted block 19, is necessary in order to remind the operator of charging the bell with the proper amount of gas, determined by the length of rod 17 before starting the flushing device, which is, as will be described later on, unlocked on locking block 19 to rod 14.

In order to prevent the gas from passing from the bell back into the generator, but on the other hand to allow the gas to pass freely from the generator into the gas-bell, I have provided the following water-seal which is shown in Fig. 4.

Tank 11, containing the bell, is provided with a false bottom 40 forming with the actual tank bottom a chamber, which is divided into two portions 28 and 41 by the curved wall 29, fastened to false bottom 40 and extending downward to a suitable distance from the actual tank bottom leaving a suitably sized communication between chambers 28 and 41. This communication is sealed by a water-seal of suitable height as shown in Fig. 4. To the tank wall within chamber 28 is fastened shield 35 to cover opening 36, through which the gas produced by the generator enters by the way of pipe 37. The gas entering the trap through opening 36 will force the water out from under shield 35 and pass underneath the latter into chamber 28 and thence through false bottom 40 and pipe 39 fastened thereto into bell 12 (Figs. 2 and 4). On the other hand, the gas, in case the pressure in the generator should become lower than that in the gas-bell through fluctuation in the gas generation, will thus be prevented from flowing from the bell back to the generator. It is understood that when I use the term "gas" I refer to acetylene or other manufactured gas not including atmospheric air. So far this trap or water-seal is similar to those commonly used for this purpose. The distinguishing feature, however, of my arrangement of this trap underneath the gas-tank is that by the wall 29 two connecting chambers 28 and 41 are produced, one chamber containing gas and the other chamber, the purpose of which will now be described, containing air. To false bottom 40 is fastened pipe 42 which protrudes into the gas-bell and extends slightly above the water-level within the bell. To the top of bell 12 is fastened inverted tube 47 of suitable size to receive tube 42. Tube 47 extends downward to a suitable distance from the lower edge of gas-bell 12. It will be seen that if gas-bell 12 rises until the lower edge of tube 47 is in line with the water-level within the gas-bell, a water-seal of sufficient height will be left between the gas-bell 12 and tank to prevent the gas escaping through this outer seal. If now through accidental over-charging of the generator the gas-bell should tend to rise farther, the gas will escape through tube 47 now in communication with the gas-chamber of the bell and thence through tube 42 into chamber 41, which is vented to the outside air by vent-pipe 30 of sufficient height to avoid the danger of the gas escaping through this pipe coming accidentally in contact with light or fire. This device is common to all generators of this class. In false bottom 40 is further fastened the pipe 48 leading the gas from the bell to the main, from which it is distributed to the burners, which pipe may be hereinafter called the "service-pipe". Service-pipe 48 protrudes with its upper end a suitable distance above the water-level of the bell and with its lower end into the water contained in chamber 41, the distance which the pipe protrudes into the water being a few inches less than the height of the water-seal between bell 12 and tank 11 when the bell has risen to its highest position. This water-seal thus forms a safety seal which is of sufficient height to prevent the escaping of gas through this seal into chamber 41 when normal pressure conditions exist within gas-bell 12. In case, however, the pressure within gas-bell 12 should increase from some cause, this water-seal will allow the gas to escape through the lower end of service-pipe 48 into chamber 41, which is vented in the manner described above, before the gas can escape around the lower edge of the bell through the outer seal. The T connecting service-pipe 48 with the main 49 is disposed above the water-level of chamber 41 so that at any time the gas has free passage from service-pipe 48 into main 49. In order to maintain the proper water-level in air-chamber 41 and gas-trap-chamber 28, I provide a filler 31 (Figs. 1 and 2) through which the water enters chamber 41 near the bottom, and an overflow-pipe 32 also disposed within chamber 41.

Now, for the purpose of causing the gas to flow from the bell back into the generator when the water is withdrawn from the latter during the flushing operation, I provide the following means: To chamber 28 containing the gas-trap above described is connected, above the water-level a pipe 38 which extends upward several inches above the normal water-level $x$—$x$ of the generator (Fig. 1) and thence downward with a return bend entering the generator at the side, several inches below the water-line. It will be observed that this pipe where it enters the generator is sealed by the water contained therein when the machine is in operation, at which time the water-level is always at its normal $x$—$x$. If now the water-level is lowered in flushing the generator, a slight vacuum is first produced in the generator in the space above the water until the water-level has sunk to the point at which pipe 38 enters the generator. This vauum, however, owing to the short distance below the normal water-level $x$—$x$ at which pipe 38 enters the generator, is not high enough to cause suction of air through the open flush-gate back into the generator. As soon as the sinking water-level has reached the level at which pipe 38 enters, this pipe is unsealed and the gas has free passage from the bell through trap-chamber 28 and pipe 38 into the generator, so that the difference in pressure between the generator and the gas-bell is immediately equalized and gas is drawn from the bell into the generator on further continuing the flushing operation. When the water-level has reached a suitable point slightly above the flush-gate 50, the gas bell has descended to the point at which lug 16 abuts against block 19, by which further descent of the gas-bell will be prevented. If after the flushing operation flush-gate 50 is closed and fresh water supplied through funnel 70 and filling pipe 73, entering chamber 10 at the level of flush-gate 50, the water-level will rise in the generator and the gas contained therein be returned through pipe 38 into the gas-bell, which will gradually rise to its height which it had before the flushing operation. As soon as the water-level has passed the point at which pipe 38 enters the generator, this pipe will be sealed and the gas be prevented from returning from the bell into the generator.

In order to prevent the flush-gate 50, which may be of any suitable construction, from being opened before the provisions described above have been made for replacing the water drawn from the generator by gas, I provide the following means: With flush-gate 50 is operatively connected shifting-rod 51 and disposed on generator-tank 10 to be shifted on opening of the flush-gate either upward or downward according to the construction of the latter. Rod 51 controlling the operation of flush-gate 50 is guided near its upper end in vertical direction by bracket 52 suitably fastened to stand-pipe 71, to be described later on. At the upper end of rod 51 is provided an eye 53 through which the left-hand end of bar 44 (which may be hereinafter called "lock-bar") passes when in its normal position shown in Fig. 1, thus locking rod 51 and flush-gate 50. Lock-bar 44 is guided to have horizontal shifting motion by means of bracket 43 fastened on generator 10 and by bracket 46 supported by gas-pipe 37. The right-hand end of bar 44 is linked to hand-lever 20, already described, by means of link 45 engaging lever 20 in a slot 21, in order to allow of sufficient play when the lever is lifted on rising of gas-bell 12 as described before (Fig. 1).

In order to keep the carbid-hopper-cover 55 closed whenever the means for passing the gas from the bell back to the generator are in operation, I provide the following device: At the lower end of rod 54 is provided an eye 56, and rod 54 besides passes near eye 56 through an eye 57 provided in lock-bar 44, so that rod 54 will slide in eye 57 when the cover 55 is opened, sufficient length of rod being left between eyes 57 and 56 to allow of the upward shifting of rod 54 and of the proper opening of cover 55 in order to charge the carbid-hopper. On pipe-arm 61, to be described later on, is provided a pin 58 at a suitable height to engage eye 56 of rod 54 when lock-bar 44 is shifted from the position in which it is shown in Fig. 1 to the right. It will be seen that by this shifting operation rod 54 will be locked by means of pin 58 engaging in eye 56 and thus carbid-hopper 55 will be kept from being opened. Furthermore, it will be seen that in this position the left-hand end of lock-bar 44 has slipped out of eye 53 of flush-gate rod 51 so that this rod is now free to allow the flush-gate to be operated.

When lock-bar 44 has been shifted to the right so that the flush-gate can be opened, provisions are made to prevent bar 44 from being returned into the position shown in Fig. 1 unless the water-level in the generator has been restored to its normal height indicated by the dotted line $x$—$x$ in Fig. 1. For this purpose stand-pipe 71, communicating at its lower end with flush-gate 50 and having near its upper end the overflow 72, is provided with branch-pipe 61 already referred to, which is L-shaped and open at the top and which communicates with stand-pipe 71 so that the water-level therein will be at the same height $x$—$x$ as in the stand-pipe (Fig. 1). Within pipe 61 is disposed float 77 provided with an upward extending rod 78, the upper end of which is bent downward so as to form a hook 76 (Figs. 1 and 2). Rod 78 is of suitable length so as to extend beyond lock-bar 44 causing its hook-shaped portion 76 to be above bar 44 when the water in the generator is at its normal level $x$—$x$. Moreover, the hook 76 is of suitable size to engage and rest upon bar 44 in case the water-level, and thus float 77, sinks during the flushing operation. Bar 44 is provided near eye 57 with two cams 75, forming the notch between (Fig. 2). If now bar 44 is shifted to the right (Fig. 1) and the flushing operation has caused the water to sink below level $x$—$x$, hook 76 will rest upon bar 44 having its downward pointing end within the notch, which is suitably disposed so as to be then in the path of the hook. Thus it will be seen lock-bar 44 is prevented from being returned into its normal position shown in Fig. 1 as long as the water in the generator is below the normal $x$—$x$.

When in the position shown in Fig. 1, lock-bar 44 is normally locked by the following means: On shaft 62 of the carbid-feed device 60 (description of which is omitted since its structure has no bearing upon this invention) is loosely disposed downward pointing lever 63 which is prevented from being shifted axially on shaft 62 by collar 64 adjustably fastened on shaft 62 by means of thumb-screw 65. Furthermore the lower end of lever 63 is resting in the position shown in Fig. 1 on a bracket 66 suitably fastened to the frame carrying a part of the carbid-feeding device. To the lower end of lever 63 is pivoted with a loose fit, rod 67, the free end of which passes with a loose fit through bracket 68 fixed on generator 10; the end of rod 67 passes, when lock-bar 44 is in the position shown in Fig. 1, through an eye 69 provided on bar 44. Thus rod 67 is the locking-rod for the different devices described above, since none of these devices can be operated so long as rod 67 engages eye 69 of lock-bar 44. Rod 67 may be withdrawn from eye 69 by loosening thumb-screw 65 of collar 64; and by shifting lever 63 on shaft 62 to the left, which will cause the lower end of lever 63 to slide from bracket 66 on which it rested heretofore. Thus rod 67 is free to be withdrawn from eye 69.

Regarding the structure of the carbid-feed device, not being shown and described here it may be stated that lever-arm 63 operating lock-rod 67 may be operatively connected in any suitable manner to various kinds of carbid-feed devices used in these machines; the fundamental idea being that the disconnecting of lever 63 from the feeding device in order to unlock bar 44 must cause said feeding device to remain inoperative, while the locking of bar 44 must restore the device to operativeness.

The detail arrangement of the structure by which the disconnecting of lever 63 from the feeding device will render said device inoperative, of course varies considerably according to the construction of the carbid feeding device used. As an example, I have illustrated in Fig. 1 a structure of that kind, which I have described and shown in detail in a copending application Serial No. 358,713. As will be seen from Fig. 1, two collars $a$ and $b$ with beveled surfaces, facing each other, are provided on shaft 62. Collar $a$ is fixed on shaft 62 and collar $b$ loose thereon but fixed to the supporting clamp of member 60 of the carbid feeding device, which member is suitably rocked and transmits its rocking motion to shaft 62. It will be seen from Fig. 1 that so long as collar 64 is tightened on shaft 62 so that collar $b$ will bear against collar $a$ as shown in this figure, member 60 will be thus coupled to shaft 62 and the latter must follow its rocking motion. If, on the other hand, collar 64 is loosened and laterally shifted in order to withdraw rod 67 from eye 69 as described above, it will be seen that collar $b$ will glide off on the beveled surface of collar $a$, should member 60 be accidentally rocked and thus member 60 will fail to transmit its motion to shaft 62.

The flushing of the generator takes place as follows: Normally, when the generator is in operation, the different devices described above are in the position shown in Fig. 1. If now flushing is required, the operator has first to unlock bar 44 by operating lever 63 in the manner described above. In case the gas-bell should not already contain an amount of gas sufficient to replace the water drawn from the generator during the flushing operation, block 19 (Figs. 5, 6 and 7) will rest on the upper socket 15, in which position pin 24 will prevent the operator from throwing the handle 20 in the direction indicated by the arrow in Figs. 1 and 7, in order to unlock the flush-gate-rod 51 as described before. This will remind him to operate the carbid-feeding mechanism by hand until gas-bell 12 has risen sufficiently to lift block 19 by means of rod 17 and to free handle 20 from pin 24, as also described before. The operator is now sure to have the proper amount of gas in the bell to safely flush the generator. If lever 20 is thrown in the direction indicated by the arrow in order to unlock flush-gate-rod 51, block 19 is locked to rod 14 by means of eccentric 26. Furthermore, in operating lever 20 as described, rod 54 controlling carbid cover 55 has been locked by the shifting of bar 44 to the right, so that the operator is prevented from opening the carbid-hopper during the flushing operation. If now flush-gate-rod 51 is operated and gate 50 opened, the water-level will sink gradually to the level at which pipe 38 enters the generator, so that this pipe is unsealed thereby and the gas may pass freely from the bell back to the generator as described above, in order to replace the water drawn through the flush-gate. Bell 12 will thus gradually sink until its guide-lug 16 strikes block 19 clamped on rod 14 as mentioned above. This will stop the further downward movement of bell 12 and thus the flowing of gas from the bell to the generator. Since the length of rod 17 is dimensioned so that when lug 16 has traveled the distance between head 18 of rod 17 and block 19, and the bell has thus discharged the amount of gas into the generator measured by this distance, the water in the generator will be close to the upper edge of the flush-gate opening and the expansion of the gas will allow the water to be all drawn out. Thus no suction of air from the atmosphere into the generator can take place in spite of the flow of gas from the bell to the generator having ceased. Fresh water may now be supplied to the generator after gate 50 has been closed, through funnel 70 and filling-pipe 73, until the normal water-level controlled by overflow 72 has been restored. This recharging of the generator with water will cause the gas contained therein to return to the gas-bell through pipe 38 and cause same to rise to the same height at which it was before opening the flush-gate. In passing the point at which pipe 38 enters generator 10 on its rising to the normal level $x$—$x$, the water will seal pipe 38 and now prevent the flowing of the gas from the bell back to the generator. On reaching its normal level $x$—$x$, the water in float-pipe 61 has lifted float 77 and thus hook 76 from engagement with notch 75 of lock-bar 44, so that this bar is now free to be shifted to the left by throwing hand-lever 20 opposite to the direction indicated by the arrow in Fig. 1 back into its normal position. Thus flush-gate-rod 51 will be locked, rod 54 of the carbid-cover will be unlocked and block 19 be freed from rod 14. Lock-bar 44 must now be locked by means of locking-rod 67, as described before, by connecting lever-arm 63 in the manner suitable for the construction of the carbid-feeding device 60; for instance as shown in Fig. 1, by tightening collar 64 against the feeding device in order to restore the control of the carbid supply to the feeding device 60. Carbid-hopper 13 may now be opened to recharge it with carbid. It will be seen that thus the entire flushing of the generator chamber is controlled finally by the one lock-rod 67, preventing, when operated to unlock lock-bar 44, any further automatic carbid feeding to the chamber while same is flushed and in turn compelling the operator to reset into and secure all the different devices coöperating with the flushing operation in their proper position before restoring the control of the carbid supply to the automatic carbid feeding device. Furthermore, it will also be seen that by the flushing in the manner described above no air will at any time enter the generator or any part of the whole apparatus which should contain only gas.

I claim:

1. In an apparatus of the character described, the combination of a generator chamber, a gasometer connected to said generator chamber, means for discharging said generator, means for measuring a predetermined amount of gas in the bell and means causing said discharging means to be operative only when the gas-bell contains said predetermined amount.

2. In an apparatus of the character described, the combination of a generator chamber, a gasometer connected to said generator chamber, a carbid feeding mechanism normally operated by the movement of said bell, means permitting the operation of said feeding mechanism by hand to cause the delivery of gas into said gasometer, means for discharging said generator, and means permitting said discharging means to be operative only when the gas bell contains a predetermined amount of gas.

3. In an apparatus of the character described, the combination of a generating chamber adapted to contain water, a gasometer connected to said generating chamber and adapted to discharge gas back into said chamber, means for discharging said generator and means for arresting the descent of the gas-bell as the gas is discharged therefrom, at a variably predetermined point when the proper amount of gas has entered the generating chamber to replace the water.

4. In an apparatus of the character described, the combination of a generator chamber, a gasometer connected to said generator chamber, means for discharging said chamber, means for measuring a predetermined amount of gas in the bell and means controlled by said measuring means permitting said discharging means to operate only when the gas-bell contains said predetermined amount.

5. In an apparatus of the character described, the combination of a generator chamber, a gasometer connected to said generator chamber, a flush-gate adapted to discharge said generator, means for measuring a predetermined amount of gas in the bell and means controlled by said measuring means permitting said flush-gate to operate only when the gas-bell contains said predetermined amount.

6. In an apparatus of the character described, the combination with a generator chamber, a gasometer connected to said generator chamber, a flush-gate adapted to discharge said generator chamber, means for measuring a predetermined amount of gas in the bell and discharging same into the generator and a lock-bar normally locking said flush-gate, said measuring means permitting said bar to unlock said flush-gate only on rising of the bell beyond a predetermined position.

7. In an apparatus of the character described, the combination of a generator chamber, a flush-gate adapted to discharge said chamber, a gasometer suitably connected to said chamber having a guide-rod suitably guiding the bell, a rod vertically disposed to coöperate with said guide-rod and the bell adapted to be engaged and lifted at its upper end by said bell on rising beyond a predetermined height, the lower end of said rod having a block slidingly disposed on said guide-rod and means adapted to lock said block thereto, to check the further descent of the bell beyond said block.

8. In an apparatus of the character described, the combination of a generator chamber, a flush-gate adapted to discharge said chamber, a gasometer suitably connected to said chamber having a guide-rod suitably guiding the bell, a rod vertically disposed to coöperate with said guide-rod and the bell adapted to be engaged and lifted at its upper end by said bell on rising beyond a predetermined height, the lower end of said rod having a block slidingly disposed on said guide-rod and means adapted to lock said block thereto, to check the further descent of the bell beyond said block, a lock-bar normally locking said flush-gate and operatively connected to said block locking means to unlock said flush-gate when said block-locking means are operated and means for causing said block-locking means to be operative only on rising of the bell beyond a predetermined height.

9. In an apparatus of the character described, the combination of a generator chamber, a flush-gate adapted to discharge said chamber, a gasometer suitably connected to said generator chamber having a guide-rod guiding the bell, a rod vertically disposed between said guide-rod and the bell adapted to be engaged and lifted at its upper end by said bell on rising beyond a predetermined height, the lower end of said rod having a block slidingly disposed on said guide-rod and an eccentric and a hand-lever operating said eccentric disposed in said block and adapted to lock said block to its guide-rod, a lock-bar normally locking said flush-gate and operatively connected to said hand-lever to unlock said flush-gate when said block is locked and means for causing said hand-lever to be operative only on rising of the bell beyond a predetermined height.

10. In an apparatus of the character described, the combination of a generator chamber, a flush-gate adapted to discharge said chamber, a gasometer suitably connected to said generator chamber having a guide-rod guiding the bell, a rod vertically disposed between said guide-rod and the bell, adapted to be engaged and lifted at its upper end by said bell on rising beyond a predetermined height, the lower end of said rod having a block slidingly disposed on said guide-rod, an eccentric and a hand-lever operating said eccentric disposed in said block and adapted to lock said block to its guide, a lock-bar normally locking said flush-gate and operatively connected to said hand-lever to unlock said flush-gate when said block is locked and a pin suitably fixed to cause said hand-lever to be operative only on rising of the bell beyond a predetermined height.

11. In an apparatus of the character described, the combination of a generator chamber, a flush-gate adapted to discharge said chamber, a gasometer suitably connected to said chamber having a guide-rod suitably guiding the bell, a block slidingly disposed on said guide-rod, and means adapted to lock said block thereto, to check the further descent of the bell beyond said block, a lock-bar normally locking said flush-gate and operatively connected to said block locking means to unlock said flush-gate when said block locking means are operated.

12. In an apparatus of the character described, the combination of a generator chamber, a flush-gate adapted to discharge said chamber, a gasometer suitably connected to said generator chamber having a guide-rod guiding the bell, a block slidingly disposed on said guide-rod, a clamp and a hand lever operating said clamp and adapted to lock said block to its guide, a lock-bar normally locking said flush-gate and operatively connected to said hand lever to unlock said flush-gate when said block is locked.

13. In an apparatus of the character described, having no vent to the outside air, the combination with a gas generator having a flush-gate and adapted to contain water, a gas-bell operatively connected with the generator, of means for permitting the gas in the gas-bell to reënter the generator only as the water is discharged therefrom, and means for arresting the descent of the gas bell at a predetermined point whereby the discharge of gas from the open flush gate may be prevented by atmospheric pressure.

14. In an apparatus of the character described, having no vent to the outside air, the combination with a generator having a flush-gate and adapted to contain water, and a gas-bell operatively connected with the generator, of means for providing a sufficient amount of gas in the gas-bell to fill the volumetric space of the generator, means for permitting such gas to return to the generator only as the water is withdrawn therefrom, and means for arresting the descent of the gas-bell at a predetermined point whereby the escape of gas from the open flush-gate may be prevented by atmospheric pressure.

15. In an apparatus of the character described, the combination with a generator chamber, a flush-gate adapted to discharge said chamber, a gasometer having a gas bell suitably connected to said chamber, and means for permitting the gas to normally flow only from said generator chamber to the gas bell; of means for permitting the gas to return from said gas bell to said generator chamber after said flush-gate is open to discharge said chamber, means for arresting the descent of the gas bell as the gas is discharged therefrom when the proper amount of gas has entered the generator chamber to replace the water.

16. In an apparatus of the character described, the combination with a generator chamber, a flush-gate adapted to discharge said chamber, a gasometer having a gas bell suitably connected to said chamber, and means for permitting the gas to normally flow only from said generator chamber to the gas bell; of means, controlled by the water level in said generator, for permitting the gas to return from said gas bell to said generator chamber when said flush-gate is open to discharge said chamber, means for arresting the descent of the gas bell as the gas is discharged therefrom when the proper amount of gas has entered the generator chamber to replace the water.

17. In an apparatus of the character described, the combination with a generator chamber adapted to contain water, a gasometer suitably connected therewith and a water-seal between said generator chamber and said gasometer causing the gas to flow only from said chamber to the bell; of a pipe leading from said bell into said chamber at a suitable distance below the normal water-level in said chamber, being normally sealed by said water and having a return bend between said bell and said generator disposed at a suitable distance above the normal water-level, said seal pipe adapted to be unsealed during the flushing operation to permit the gas to flow unobstructed between the bell and the generator in either direction through it.

18. In an apparatus of the character described, the combination with a generator chamber adapted to contain water, a gasometer suitably connected therewith, a flush-gate adapted to flush said generator and a lock-bar adapted to control the operation of said flush-gate; of means controlled by the rise and fall of the water in said generator locking said bar when said water-level is abnormal and freeing said bar when said level has been restored to normal.

19. In an apparatus of the character described, the combination with a generator chamber adapted to contain water, a gasometer suitably connected therewith, a flush-gate adapted to flush said generator and a lock-bar adapted to control the operation of said flush-gate; of means controlled by the rise and fall of the water in said generator locking said bar when the water-level is below the normal and freeing said bar when said level has been restored to normal.

20. In an apparatus of the character described, the combination of a generator chamber adapted to contain water, a gasometer suitably connected therewith, a flush-gate on said generator, a lock-bar adapted to control the operation of said flush-gate; of a float-chamber communicating with said generator having a float adapted to engage and lock said lock-bar, said float locking said bar on sinking of the water-level in said generator below the normal during the flushing operation and unlocking said bar after the water-level has been restored to normal.

21. In a machine of the character described, the combination with a generator, a gasometer operatively connected therewith, an automatic carbid-feeding device adapted to normally feed said generator, means for flushing said generator and a lock-bar normally locking said flushing means in inoperative position; of a lock-rod normally locking said lock-bar while said feeding device is operative, said lock-rod adapted to render said feeding device inoperative on unlocking said lock-bar.

22. In an apparatus of the character described the combination of a generator chamber adapted to contain water, a gasometer connected with said generator chamber having a bell with vertical movement, a flush gate on said generator for discharging the water therefrom and a locking device for normally locking said gate shut, and means connected with the gas bell and operated by the vertical movement thereof for maintaining said locking device in locking position while the bell is below a predetermined point.

23. In an apparatus of the character described, the combination of a generator chamber adapted to contain water, a gasometer connected with said generator chamber having a bell with vertical movement, a flush gate on said generator for discharging the water therefrom and means controlled by the rise and fall of the gasometer bell for maintaining said flush gate closed while the gas bell is below a predetermined position.

FRANCIS B. RAY.

Witnesses:
H. ALFRED JAUKE,
OCTAVIUS KNIGHT, Jr.